United States Patent [19]

Santos

[11] 4,082,245
[45] Apr. 4, 1978

[54] EJECTOR RETRACTION MECHANISM

[76] Inventor: Adelino Claudio Santos, 649 New Britian Ave., Hartford, Conn. 06106

[21] Appl. No.: 773,052

[22] Filed: Nov. 26, 1976

[51] Int. Cl.² .......................... B29F 1/14; B29C 7/00
[52] U.S. Cl. ..................................... 249/68; 249/205; 425/444; 74/527; 425/DIG. 5
[58] Field of Search .......................... 249/67, 68, 205; 425/444, DIG. 5

[56] References Cited

U.S. PATENT DOCUMENTS

| | | | |
|---|---|---|---|
| 2,483,093 | 9/1949 | Harvey | 249/68 |
| 2,483,094 | 9/1949 | Harvey | 249/68 |
| 2,860,376 | 11/1958 | Graves et al. | 249/674 |
| 3,516,302 | 6/1970 | Muttart | 249/68 X |
| 3,724,802 | 4/1973 | Veneria | 249/67 |
| 3,811,645 | 5/1974 | Feist | 249/68 |
| 3,986,805 | 10/1976 | Haines | 249/68 X |

Primary Examiner—J. Howard Flint, Jr.
Attorney, Agent, or Firm—McCormick, Paulding & Huber

[57] ABSTRACT

A mold base supporting mold cavity plates for movement between open and closed positions and having an ejector mechanism movable between ejecting and retracting positions relative to one of the mold cavity plates includes an ejector retraction mechanism for moving the ejector mechanism to its retracted position relative to the one mold cavity plate before the cavity plates reach a predetermined position during the mold closing cycle and for releasably retaining the ejector mechanism in its retracted position until the mold base opens to a predetermined position.

22 Claims, 9 Drawing Figures

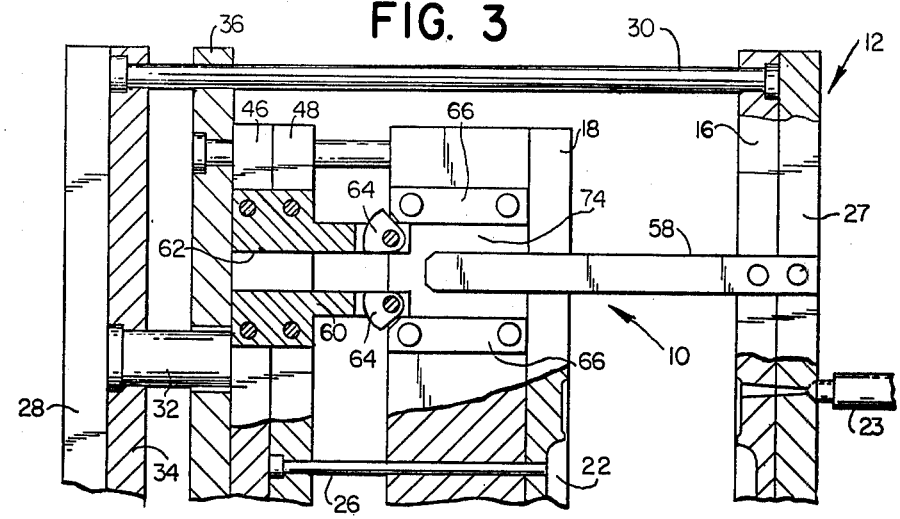
FIG. 3
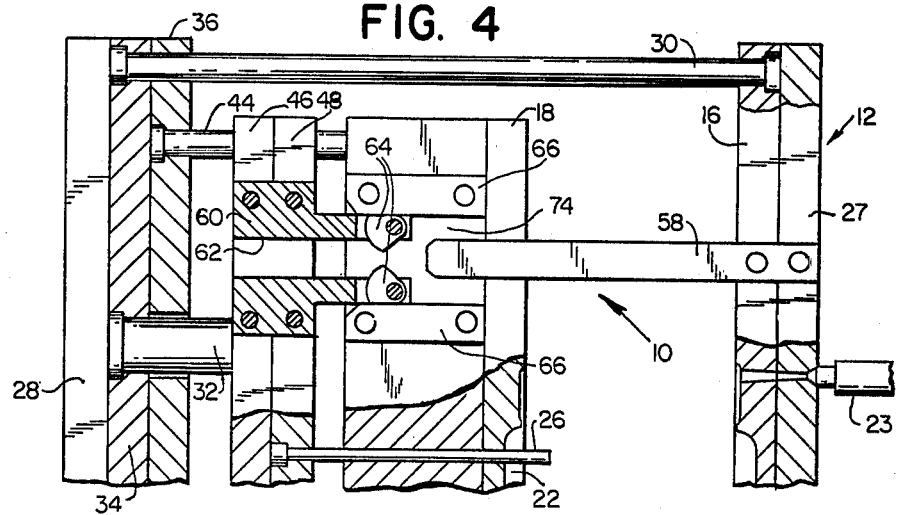
FIG. 4
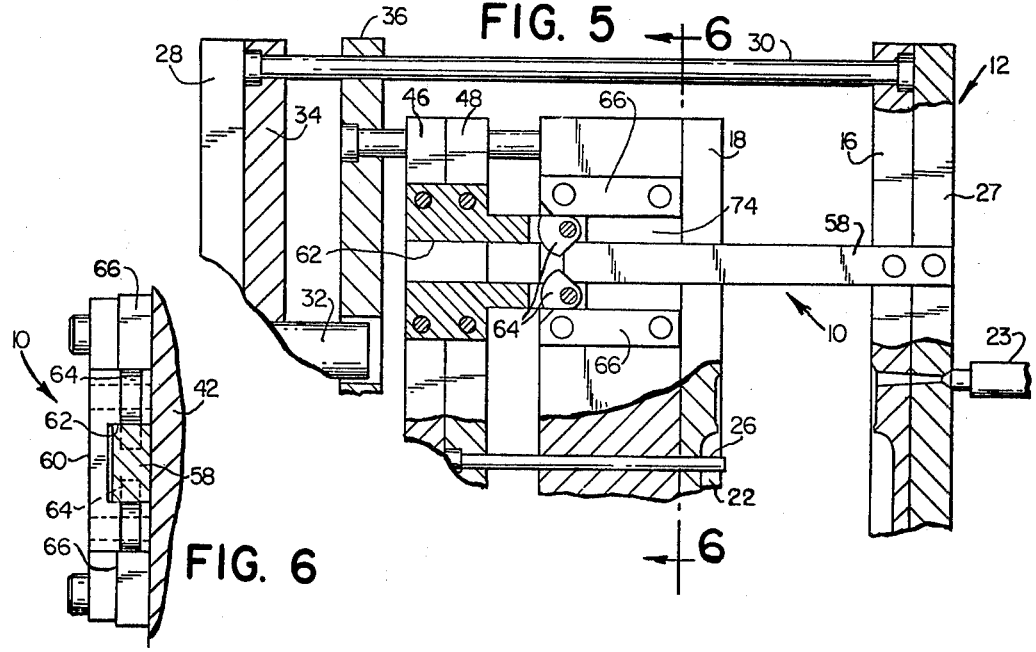
FIG. 5
FIG. 6

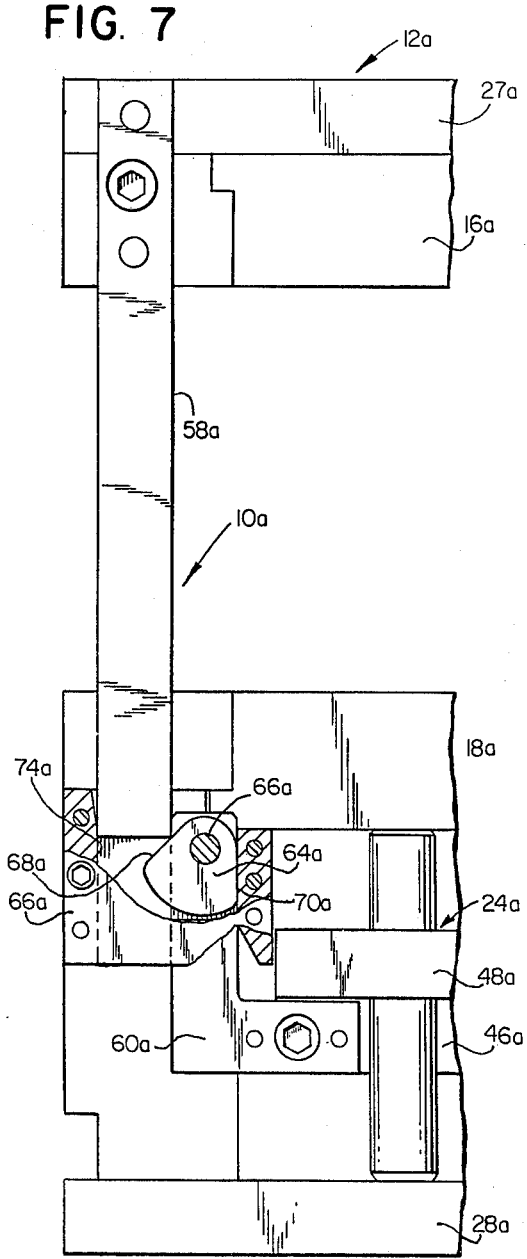
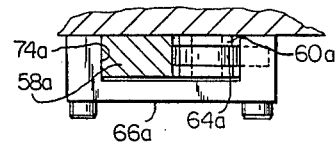
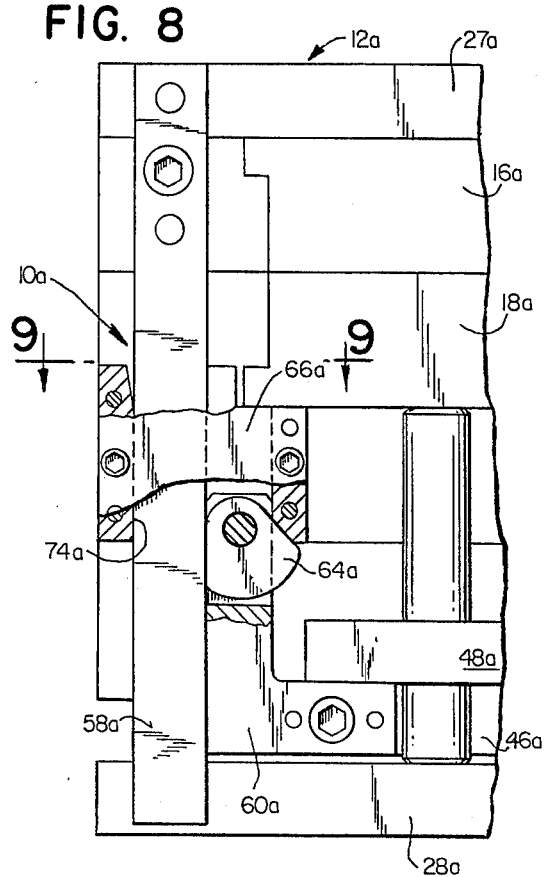

EJECTOR RETRACTION MECHANISM

BACKGROUND OF THE INVENTION

This invention relates in general to molding apparatus and deals more particularly with an improved ejector retraction mechanism for positively controlling the retraction of an ejector mechanism in a molding apparatus.

In an apparatus for the manufacture of molded products, and utilizing molding dies an ejector mechanism is usually provided to assure positive removal of finished workpieces from the dies during the die opening cycle. Such ejector mechanisms usually employ one or more ejector pins movable into a die cavity section associated with one of the molding dies during the die opening cycle. An ejector retraction mechanism operates to retract the ejector pins from the mold cavity section during the die closing cycle and before the dies are fully closed to prevent damage to the ejector pins or the molding cavity. More sophisticated molding apparatus for the production of hollow molded products usually requires one or more core elements arranged to move with and relative to one of the mold cavity plates to move into and out of the mold cavity defined by the plates during the operational cycle of the apparatus. More specifically, the core element or elements are generally arranged to move into molding position during the mold closing cycle and to retract during the opening cycle. An ejector retraction mechanism for such molding apparatus must operate in properly timed relation with the cycle of the molding dies to permit the ejector mechanism to operate during the opening cycle and to assure positive retraction of the ejector mechanism during the closing cycle to prevent risk of damage to either the ejector mechanism or the core element or elements which may move in the path of travel of the ejector mechanism. The aforedescribed problem is discussed in some detail in U.S. Pat. No. 3,516,302 to Muttart, issued June 23, 1970. The present invention is concerned with improved ejector retraction mechanism of the aforedescribed type. It is the general aim of the present invention to provide an improved ejector retraction mechanism of simple durable construction for low cost manufacture and simple installation and which may be installed on a molding apparatus or mold base therefor without reducing the effective usable area of the molding die cavity plates.

SUMMARY OF THE INVENTION

In accordance with the present invention, an improved ejector retraction mechanism is provided for a molding apparatus having mold cavity plates movable between open and closed positions and an ejector mechanism movable with and relative to one of the mold cavity plates. The retraction mechanism comprises an actuating member mounted in fixed position relative to one of the mold cavity plates, a blocking member, and means supporting the blocking member for movement with the ejector mechanism and for pivotal movement relative thereto between a first position wherein the blocking member is in the path of the actuating member and a second position wherein the blocking member is out of the path of the actuating member, and means for pivoting the blocking member from its first to its second position in response to movement of the ejector mechanism to its ejecting position, said actuating member being engageable with said blocking member in the second position to retract the ejector mechanism in response to movement of the mold cavity plates toward each other.

BRIEF DESCRIPTION OF THE DRAWINGS

FIG. 2-5 are similar to FIG. 1 and illustrate the operating sequence of the apparatus of FIG. 1.

FIG. 6 is a somewhat enlarged fragmentary sectional view taken along the line 6—6 of FIG. 5.

FIG. 7 is a fragmentary side elevational view of a mold base having an ejector retracting mechanism illustrating another embodiment of the invention, the mold base shown in an open position.

FIG. 8 is similar to FIG. 7 but shows the molded base in closed position.

FIG. 9 is a sectional view taken along the line 9—9 of FIG. 8.

BRIEF DESCRIPTION OF PREFERRED EMBODIMENTS

Figure 1:
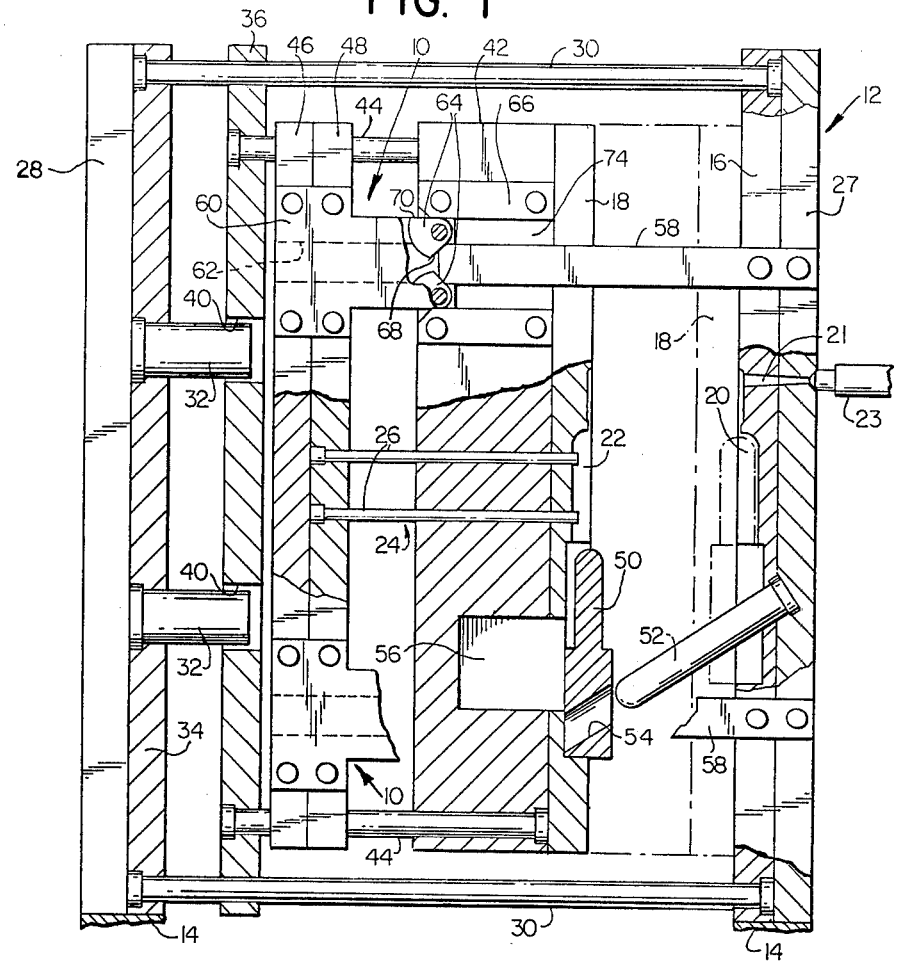
FIG. 1 is a fragmentary side elevational view of a molding apparatus having an ejector retraction mechanism embodying the present invention and shown partially in section.

Turning now to the drawings and referring first particularly to FIG. 1, an ejector retraction mechanism embodying the present invention and indicated generally by the reference numeral 10 is shown attached to a standard mold base indicated generally at 12 and mounted in an injection molding machine, portions of the machine frame being indicated at 14, 14. The mold base 12 carries first and second mold cavity plates 16 and 18 which respectively define mold cavities sections 20 and 22. The mold cavity plates are supported for relative reciprocal movement between open and closed positions. In an open position, shown in full lines in FIG. 1, the mold cavity plates are spaced apart a substantial distance, and in closed position, indicated by broken lines, the plates are engaged in face-to-face relation so that the cavities sections 20 and 22 cooperate to define a mold cavity. In the closed position a passageway or sprue 21 defined by the mold cavity plates 16 and 18 and a part of the mold base 12 communicates with an injection nozzle 23, which comprises a part of the injection molding machine, and with a gate associated with the mold cavity for conducting plastic or other flowable material from the nozzle 23 into the mold cavity. The mold base 12 further includes an ejector mechanism, indicated generally at 24, which has one or more ejector pins 26 supported for movement into and out of the cavity section 22 when the mold base 12 is in an open position. The ejector retraction mechanism 10, which comprises the present invention, functions to positively retract the mold pins 26 from the cavity section 22 as the mold cavity plates 16 and 18 move toward closed position and to lock the retractor mechanism 24 in a retracted position while the mold cavity plates 16 and 18 are closed and until the plates open to a predetermined position, as will be hereinafter more fully described.

Considering first the mold base 12 in further detail, it generally comprises a clamp plate 27 and an anchor plate 28 supported in fixed relation to the machine frame 14 and maintained in parallel spaced relation by parallel tie rods 30, 30 which extend therebetween. The first mold cavity plate 16 is mounted in fixed position on the clamp plate 27, substantially as shown. The anchor plate 28 carries knockout pins 32, 32 which are retained in fixed position by a knockout retainer plate 34 mounted adjacent the anchor plate. The mold cavity plate 18 and its associated ejector mechanism 24 are carried by a backup plate 36 slidably supported on the tie rods 30, 30. Bore openings 40, 40 formed in the backup plate 36 and respectively aligned with the knockout pins 32, 32 receive the latter pins therethrough. A mold cavity backup plate 42 carries the second mold cavity plate 18 and is supported in fixed parallel relation to the backup plate 36 by parallel tie rods 44, 44. An ejector pin backup plate 46 and an ejector pin retainer plate 48, which comprise the ejector mechanism 24, are slidably supported on the tie rods 44, 44 for movement toward and away from the mold cavity plates. The plates 46 and 48 to carry the ejector pins 26, which extend in parallel relation through the backup plate 42 and the mold cavity plate 18, and move the pins 26 into an out of the mold cavity section 22, as will be hereinafter further discussed.

The illustrated molding apparatus 12 is particularly adapted to form a hollow molded product (not shown) and includes a core element 50 slidably mounted on the mold cavity plate 18 for movement into and out of the mold cavity formed by the cavities sections 20 and 22. A slant pin 52 carried by the plates 16 and 28 cooperates with an inclined bore 54 formed in the core element 50 to move the core element into and out of the mold cavity, in a manner well known in the art. A recess 56 in the plates 18 and 42 receives the slant pin 52 when the mold cavity plates 16 and 18 move to closed position. Reference may be had to the aforementioned patent to Muttart for further disclosure of a mold base of the aforedescribed general type.

The ejector retraction mechanism 10 generally comprises an actuating member or elongated actuating rod 58 which is fastened at one end to the mold cavity plate 16 and the clamp plate 27 adjacent the side surfaces thereof and extends toward the anchor plate 28 in the direction of mold cavity plate movement. A support member 60 mounted in fixed position adjacent the side surfaces of the ejector pin backup plate 46 and the retainer plate 48 extends toward the mold cavity plates 16 and 18 and has a passageway or channel 62 aligned with the actuator rod 58 for receiving the free end of the rod. A pair of blocking members 60 at opposite sides of the channel 62. Each blocking member 64 is supported on a pivot pin 66 which extends through the support member 60 to pivot about an axis which extends transversely of the direction of mold cavity plate movement. Each blocking member 64 comprises a generally wedge-shaped member and has first and second cam surfaces at its opposite sides indicated respectively at 68 and 70 which diverge in the direction of the anchor plate 28. Even blocking member 64 is supported to pivot between a first position wherein a portion of the first cam surface 68 is disposed within the channel 62 and in the path of the actuator rod 58 and a second position wherein a portion of its cam surface 70 is disposed outwardly beyond an associated side surface of the support member 60 and its cam surface 68 is out of the path of the actuator rod 58. A pair of cam members 66, 66 mounted in fixed position on the mold cavity backup plate 42 cooperate to define a passageway 74 for receiving a free end portion of the support member 60. The cam members 62, 62 are adapted for respective engagement with the cam surfaces 70, 70 on the blocking members 64, 64 to move each of the latter members from its first to ist second position when the support member moves into the passageway 74 and to retain the blocking members 64, 64 in second position while the support member remains generally within the passageway 74.

Figure 2:
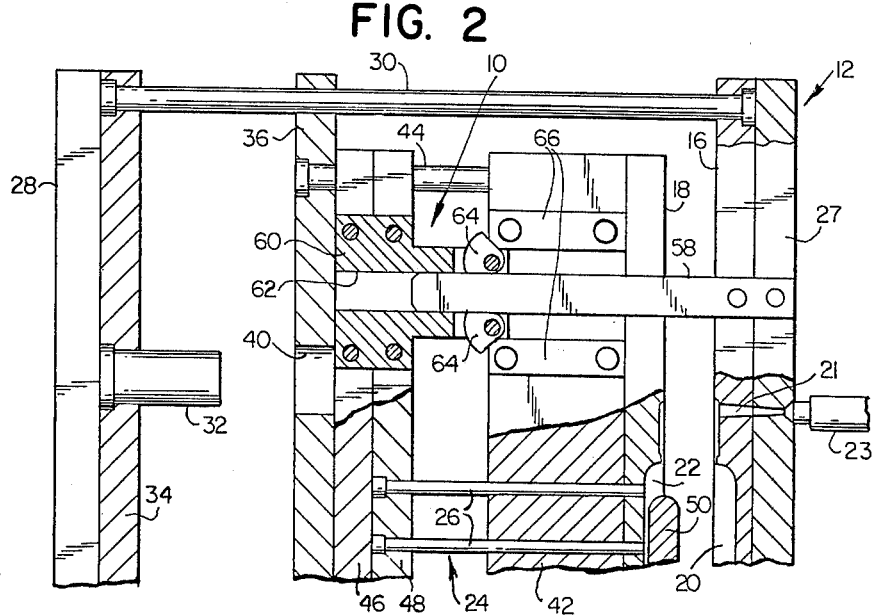

Referring now to FIGS. 2–5 and considering the operation of the molding apparatus 12 and more particularly the operation of the ejector retraction mechanism 10, during the mold opening cycle when the apparatus 12 is in the position shown in FIG. 2 the first and second mold cavity plates 16 and 18 have begun to separate. The core element 50 urged by the slant pin 52 has begun to retract from the mold cavity section 22. At this point in the machine cycle the actuator rod 58 extends into the channel 62 between and beyond the blocking members 64, 64. Each blocking member 64 is maintained in its first position by engagement of its cam surface 68 with an associated side surface of the actuator rod 58. Each cam surface 70 is disposed outwardly beyond an associated side surface of the support member 60 and in the path of an associated cam member 66 whereby to prevent the support member 60 from entering the passageway 62 and moving toward the mold cavity plate 18. Thus, the blocking member 64, 64 cooperates with the actuator rod 58 and the cam member 66, 66 to latch the retractor mechanism 24 in its fully retracted position wherein the plate 46 is in face-to-face engagement with the backup plate 36, so that the ejector pins 26, 26 cannot enter the cavity section 22 to interfer with the core element 50, which is not yet fully retracted from the mold cavity section 22.

As the mold opening cycle continues, the backup plate 36 continues to move from its position of FIG. 2 in the direction of the anchor plate 28 carrying with it the second mold cavity plate 18. When the backup plate 36 reaches its position of FIG. 3 the actuator rod 58 is fully retracted from the channel 62. The core pin 50 is also fully retracted from the mold cavity section 22 to its full line position in FIG. 1. The knockout pins 32, 32 engage the ejector pin support plate 46 to arrest its further movement in the direction of the anchor plate 28. However, the backup plate 36 continues to move in the direction of the anchor plate 28 which causes the support member 60 to enter the passageway 74 between the cam members 66, 66. As the support member 60 enters the passageway 74 each cam member 66 engages a cam surface 70 on an associated blocking member and pivots the blocking member to its second or blocking position (FIG. 4). The resulting movement of the ejector pin support plate 46 toward the second mold cavity plate 18 causes the ejector pins 26 to enter the cavity 22 to positively eject a molded workpiece therefrom. When the backup plate 36 engages the knockout pin retainer plate 34, as shown in FIG. 4, the mold cavity plates 16 and 18 are in a fully open position.

During the mold closing cycle, as backup plate 36 is moved from its position of FIG. 4 in the direction of the mold clamping plate 27 to its position of FIG. 5 by an associated molding machine mechanism (not shown). During the mold closing cycle, the free end portion of the actuator rod 58 engages the cam surfaces 68, 68 on the blocking members 64, 64 which are held in second position by the cam blocks 66, 66 to arrest movement of the ejector mechanism 24 in the direction of the clamping plate 27. However, the backup plate 36 and the second mold cavity plate 18 which it carries continue to move in the direction of the clamping plate which causes relative movement of the ejector mechanism away from the mold cavity plate 18 whereby to retract the ejector pins 26 from the mold cavity section 22.

Upon engagement of the ejector pin support plate 46 with the backup plate 36, as shown in FIG. 2, the ejector pins 26 are fully retracted from the second mold cavity so that the core element 50 may enter the cavity section 22 without risk of interference with the ejector pins 26. When the plate 46 is in the latter position (FIG. 2) the support member 60 has moved out of the passageway 74 to a position wherein the blocking members are free to pivot to second position. Thereafter, further movement of the backup plate 36 to the direction of the clamp plate 27 causes the actuator rod 58 to engage the cam surfaces 68, 68 to pivot the blocking elements 64, 64 from first to second or latching, position shown in FIG. 2. In the latter positions the blocking member 64, 64 cooperate with the actuator rod 58 and the cam blocks 66, 66 to retain the rejector mechanism 24 in its fully retracted position during the remainder of travel of the second mold cavity plate 18 to its fully closed position and until the mold cavity plates reach a predetermined open position, during the mold opening cycle, wherein the core element 50 is substantially retracted from the mold cavity section 22, as previously described.

In FIGS. 7-9 another ejector retraction mechanism embodying the invention and indicated generally by the reference numeral 10a is shown mounted on a standard mold base indicated generally at 12a. Parts of the illustrated structure which generally correspond to parts of the previously described embodiment bear the same reference numerals as the previously described parts and a letter a suffix.

The illustrated mold base 12a comprises a model H Master Unit Die marketed by Master Unit Die Products Inc., Greenville, Mich., and has an anchor plate 28a, a clamp plate 27a, and an ejector mechanism indicated generally at 24a which includes an ejector plate 46a. A first mold cavity plate 16a carried by the clamp plate 27a is reciprocally movable toward and away from a second mold cavity plate 18a supported in fixed space relation to the anchor plate 28a. In FIG. 7 the mold base 12a is shown in an open position, whereas in FIG. 8 it is closed, the mold cavity plates 16a and 18a being in face-to-face relation and defining a mold cavity (not shown). As in the previously described embodiment, the ejector mechanism 24a is arranged to move generally toward and away from the second mold cavity plate 18a when the mold base 12 is in an open position. The illustrated ejector retraction mechanism 19a functions to positively retract the ejector mechanism 24a or move the plates 46a and 48a away from the second die cavity plate 18a and from the position in FIG. 7 to the position in FIG. 8 before the plates 16a and 18a reach a predetermined position during closure of the mold base 12a.

The ejector retraction mechanism 10a generally comprises an elongated actuating member or rod 58a secured at one end to the mold base 12a adjacent a side surface thereof and in fixed relation to the first mold cavity plate 16a to move therewith. The rod 58a extends in the direction of mold cavity plate movement and toward the anchor plate 28a. A generally L-shaped support member 60a supported to move with the ejector mechanism 24a has one leg mounted in fixed position on the plate 46a and another leg which extends in the direction of the clamp plate 27a in parallel relation to the rod 58a. The actuator member 58a and the support member 60a are arranged to move past each other in generally sliding engagement when the mold base 12a is moved between its open and closed positions, substantially as shown. A blocking member 64a is received in a slot in the free end of the support member 60a and is supported thereon by a pivot pin 66a which extends transversely of the support member. The blocking member 64a comprises a generally wedged-shaped member and has cam surfaces 68a and 70a at its opposite sides which generally diverge in the direction of the anchor plate 28a. The mechanism 10a further includes a cam member or block 66a mounted on the mold base 12a adjacent a side surface thereof in fixed position relative to the second mold cavity plate 18a. A passageway or channel 74a in the block 66a receives the free end of the actuator rod 58a and the free end of the support member 60a in sliding relation therein substantially as shown. The blocking member 64a is movable relative to the support member 60a between a first position as shown in FIG. 7 and a second position shown in FIGS. 8 and 9. In the first position the cam surface 68a is disposed outwardly beyond an associated side surface of the support member 68a and into the channel 74 in the path of the actuating member 58a. In the second position (FIGS. 8 and 9) a portion of the cam surface 70a is disposed outwardly beyond an associated side surface of the support member 60a and in the path of relative movement of the support member 60a and the block 66a.

When the mold base 12a is in a substantially fully open position, as it appears in FIG. 7, the ejector mechanism 24a is in its ejecting position relative to the second mold cavity plate 18a so that ejector pins (not shown) carried by the plates 46a and 48a are disposed within an associated mold cavity section defined by the second mold cavity plate 18a. When the ejecting mechanism 24a is in its ejecting position the blocking member 64a is maintained in its first position by engagement of the cam surface 70a with a surface of the block 66a. Movement of the clamping plate 27a from its position in FIG. 7 toward its position in FIG. 8 causes the free end of the actuator rod 58a to engage the cam surface 68a to move the support member 60a and the ejector mechanism 24a toward and to its retracted position of FIG. 8. When the support member 60a reaches its position of FIG. 8 the force of the actuating rod 58 acting upon the cam surface 68a pivots the blocking member 64a to its second position enabling fthe actuating member 58a to travel past the blocking member 64a so that the first mold cavity plate 16a may move to closed position in face-to-face engagement with the second mold cavity plate 18a. During the opening cycle of the mold base 12a the actuator rod 58a cooperates with the blocking member 64a to retain the ejector mechanism 24a in its retracted position until the mold base 12a opens to a predetermined position wherein rod 58a allows the blocking member 64a to pivot to its first position.

I claim:

1. In a molding apparatus having a plurality of plates supported in parallel relation for relative reciprocal movement toward and away from each other and including first and second mold cavity plates movable between open and closed positions relative to each other and cooperating in a closed position to define a molding cavity, an ejector mechanism including a ejector plate supported for movement to and retraction from an ejecting position relative to the second mold cavity plate, and an ejector retraction mechanism for retracting said ejector plate before the first and second mold cavity plates move to a closed position, the improvement wherein said ejector retraction mechanism comprises an actuating member mounted in fixed position relative to said first mold cavity plate, a support member mounted in fixed position relative to said ejector plate, at least one blocking member carried by said support member and pivotally movable relative thereto between a first position wherein said one blocking member is in the path of said actuating member and a second position wherein said one blocking member is out of the path of said actuating memnber, and means for pivoting said one blocking member from its first to its second position in response to movement of said ejector mechanisms to its ejecting position, said actuating member being engageable with said blocking member in its second position to retract said ejector mechanism from its ejecting position in response to movement of said mold cavity plates toward closed position.

2. The combination as set forth in claim 1 wherein said one blocking member comprises a generally wedge-shaped member having diverging opposite side surfaces defining first and second cam surfaces, said means for pivoting said one blocking member being engageable with said second cam surface to pivot said one blocking member from its first to its second position, said actuating member being engageable with said first cam surface when said one blocking member is in its second position.

3. The combination as set forth in claim 1 wherein said one blocking member is supported for pivotal movement about an axis extending transversely of the direction of said reciprocal movement of said plates.

4. The combination as set forth in claim 1 wherein said means for moving said one blocking member comprises a cam member mounted in fixed position on second mold cavity plate.

5. The combination as set forth in claim 4 wherein each said member is mounted adjacent a side surface of its associated plate.

6. The combination as set forth in claim 4 wherein at least one of the members comprising said mounting member and said cam member defines a passageway and said actuating member comprises an actuating rod received in said passageway.

7. The combination as set forth in claim 6 wherein said actuating member has a generally rectangular cross section and said passageway has a generally rectangular cross section.

8. The combination as set forth in claim 6 wherein said mounting member defines one passageway receiving said actuating rod and said cam member defines another passageway receiving said support member.

9. The combination as set forth in claim 8 wherein said actuating rod has a generally rectangular cross section and said one passageway has a generally rectangular cross-section complementing the cross section of said actuator rod.

10. The combination as set forth in claim 4 wherein said cam member defines said passageway and wherein said actuating member and said support member are received in said passageway in sliding engagement with walls of said passageway and in sliding engagement with each other for relative movement in opposite directions relative to each other.

11. The combination as set forth in claim 10 wherein said support member comprises an elongated member and said one blocking member comprises a generally wedge-shaped member pivotally supported at a free end of said support member.

12. The combination as set forth in claim 11 wherein said actuating member has a generally rectangular cross section and said passageway has a generally rectangular cross section.

13. The combination as set forth in claim 10 wherein said support member comprises a generally L-shaped member.

14. The combination as set forth in claim 1 including a pair of blocking members carried by said support member and wherein said actuating member is movable between said blocking members when each of said blocking members is in its second position.

15. The combination as set forth in claim 14 wherein said means for pivoting said blocking members comprises a pair of cam members mounted in fixed position on said second mold cavity plate and cooperating to define a passageway therebetween for receiving said support member when said blocking members are in said second position and for maintaining said blocking members in said second position while said ejecting mechanism is in its ejecting position and until said ejecting mechanism is moved from its ejecting position to a retracted position by said actuating member.

16. The combination as set forth in claim 1 wherein said one blocking member in its first position cooperates with said moving means to maintain said ejector mechanism in its retracted position while said mold cavity plates move to closed position and until said mold cavity plates open to a predetermined position.

17. An ejector retraction mechanism for a molding apparatus having first and second mold cavity plates movable between open and closed positions and an ejector mechanism movable relative to the second mold cavity plate between an ejecting position and a retracted position, said ejector retraction mechanism comprising an actuator rod for mounting in fixed position relative to the first mold cavity plate, a support member for mounting in fixed position relative to said ejector mechanism for movement therewith, at least one blocking member carried by said support member and pivotally movable relative thereto between a first position wherein said one blocking member is in the path of said actuating member and a second position wherein said one blocking member is out of the path of said actuating member, and at least one cam member for mounting on said second mold cavity plate and for engaging said one blocking member in its second position to pivot said one blocking member to its first position in response to movement of said ejector mechanism to its ejecting position.

18. The combination as set forth in claim 17 wherein said one blocking member comprises a generally wedge-shaped member pivotally movable about an axis extending transversely of the direction of movement of the ejector mechanism and having diverging cam surfaces at opposite side thereof.

19. The combination as set forth in claim 18 wherein said support member comprises an elongated member supporting said blocking member near a free end thereof, said cam member comprises a block defining a passageway receiving said actuating rod and said support in sliding engagement with walls of said passageway and in sliding engagement with each other.

20. The combination as set forth in claim 19 wherein said actuating rod has a generally rectangular cross section and said passageway has a generally rectangular cross section.

21. The combination as set forth in claim 19 wherein said support member comprises an L-shaped member.

22. The combination as set forth in claim 18 wherein said ejector retraction mechanism includes a pair of blocking members and a pair of cam members, each of said blocking members being engageable with an association one of said cam members, said actuating rod being movable between and relative to said members when said blocking members are in said second position, said support member being movable between and relative to said cam members when said blocking members are in said first position.

* * * * *

UNITED STATES PATENT OFFICE
CERTIFICATE OF CORRECTION

Patent No. 4,082,245            Dated April 4, 1978

Inventor(s) Adelino Claudio Santos

It is certified that error appears in the above-identified patent and that said Letters Patent are hereby corrected as shown below:

Column 3, line 18, "an" should be --and--.

Column 3, line 68, "ist" should be --its--.

Column 5, line 14, "positions" should be --position--.

Column 6, line 46, "fthe" should be --the--.

Column 7, line 10, "memnber" should be --member--.

Column 8, line 57, "side" should be --sides--.

Column 9, lines 6-7, "association" should be --associated--.

Signed and Sealed this

Fifteenth Day of August 1978

[SEAL]

Attest:

RUTH C. MASON
Attesting Officer

DONALD W. BANNER
Commissioner of Patents and Trademarks